Patented Oct. 7, 1952

2,613,232

UNITED STATES PATENT OFFICE 2,613,232

PROCESS FOR REMOVING ORGANIC FLUORIDES FROM HYDROCARBONS

Edward J. Janoski, Philadelphia, Pa., assignor to Sun Oil Company, Philadelphia, Pa., a corporation of New Jersey No Drawing. Application November 14, 1949, Serial No. 127,249

29 Claims. (Cl. 260—676)

This invention relates to a process for purifying hydrocarbons. More particularly, this invention relates to a process for the removal of organic fluorine compounds from hydrocarbons.

Hydrogen fluoride is widely used as a catalyst in various hydrocarbon reactions, such as alkylation reactions. In these reactions organic fluorine compounds, such as alkyl fluorides, are produced. The presence of such organic fluorine compounds in hydrocarbons is undesirable because hydrogen fluoride may be formed therefrom, which exerts corrosive action on metal surfaces which it may contact, such as metal containers for the hydrocarbons. Organic fluorides are especially objectionable when present in hydrocarbons employed for combustion, since hydrofluoric acid is formed in the combustion zone, and corrodes metal and glass surfaces which it may contact. For example, in homes employing propane gas for domestic purposes, such as heating and cooking, a fluoride concentration of as little as 200 p. p. m. (parts per million) in the propane has been observed to cause the etching of glass surfaces in such homes, such as glass windows.

Various methods for removing organic fluorides from hydrocarbons have been described. Such methods, however, do not remove traces of such fluorides, and frequently exert a deleterious effect on the hydrocarbon charge. For example, it has been proposed to employ concentrated sulfuric acid to remove organic fluorine compounds from hydrocarbons. However, this process does not completely remove traces of the fluorine compound, and has the serious fault of acting on the hydrocarbon charge to form a black resinous material therein, which material fouls the system and progressively decreases the rate of removal of the fluorine compound.

It has now been found that small amounts of organic fluorides may be substantially completely removed from hydrocarbons by contacting a mixture of hydrocarbons and organic fluorides with concentrated sulfuric acid containing added thereto a salt or an oxide of a rare earth metal.

In accordance with the present invention, a hydrocarbon charge containing an organic fluoride admixed therewith, such as an alkyl fluoride, is contacted with concentrated sulfuric acid containing added thereto a salt or an oxide of a rare earth metal. It has been found that the present process may be employed to remove even minute traces of organic fluorides, so that the final fluoride concentration is less than 2 p. p. m., and that the absorbing system is not fouled with the black resinous material observed with the same system in the absence of the dissolved rare earth salt or oxide.

A preferred embodiment of the present invention is the addition of a quantity of siliceous material to the above described absorbing system. As has been found, the addition of a siliceous material to the absorbing system gives a large increase in efficiency under otherwise comparable operating conditions.

In some instances, it may be unnecessary to completely remove fluorides from the hydrocarbon charge, the final concentration thereof depending largely on the use intended for the resulting charge. In such case, the process of the present invention may be employed to reduce the fluoride concentration to a desired value, say to about 15 or 25 p. p. m. and the advantages of the process in that the system is not fouled with a black resinous material is retained.

The hydrocarbon charge from which the alkyl fluoride is removed is advantageously of a paraffinic or cycloparaffinic nature. Thus, the charge may consist of a normally gaseous hydrocarbon, such as ethane, propane, butane, isobutane, or mixtures thereof, and operation therewith may be in the gaseous or liquid phase. For example, operation in the gas phase is advantageously accomplished by bubbling the fluoride-containing charge through the sulfuric acid solution, or by passing the gaseous charge and acid in countercurrent relation through an absorption tower. Operation in the liquid phase is advantageously accomplished by operating the system under pressure and temperature conditions sufficient to maintain the charge in the liquid phase, and may be by batchwise operation, or by continuous operation such as by passing the liquefied hydrocarbon charge to be treated and the sulfuric acid solution in countercurrent relation through a suitable absorption tower.

Organic fluorides such as alkyl fluorides may be removed from normally liquid hydrocarbons, such as hexanes, cyclohexanes, heptanes, octanes, decanes, and the like, including their branched chain isomers, such as 2,2,4-trimethylpentane, mixtures thereof, and the like, in accordance with the process of the present invention. Here again, with normally liquid hydrocarbons, operation may be in the gaseous or liquid phase, the operating conditions being controlled so as to maintain the hydrocarbon charge in the liquid or gaseous phase, as desired.

The rare earth metal salts which may be employed in the present process are preferably the sulfate, acid sulfate, carbonate, bicarbonate, nitrate, phosphate, or acid phosphate. Cerium is the preferred rare earth metal whose salt or oxide is employed. Other rare earth metals which may be employed with good results include, for example, yttrium, scandium, lanthanum, praseodymium, and neodymium. The oxide or oxides of the above metals may advantageously be employed. Thus, a cerium oxide, preferably ceric oxide, is dissolved in concentrated sulfuric acid to form a preferred absorbing solution of the present invention.

It is advantageous to initially employ a saturated solution of the salt or oxide in the sulfuric acid as the absorbing system. Preferably, an excess of the salt or oxide is suspended in the sulfuric acid so that as the dissolved salt or oxide is consumed in the process, a further amount will immediately dissolve and be available for further removal of the organic fluoride. Operation of the process of the present invention in accordance with this preferred embodiment permits the removal of a relatively large amount of organic fluorides from hydrocarbons without depletion of the salt or oxide. A further advantage of this preferred embodiment is that a substantially saturated solution is maintained during the process regardless of the temperature of operation or of change in temperature during the operation. However, the concentration of the salt or oxide in the sulfuric acid may be less than that of a saturated solution, and such operation may be of advantage in some instances, such as the removal of traces of organic fluorides from a small quantity of hydrocarbons.

The concentration of the sulfuric acid employed to dissolve the salt or oxide should be between 90% and 100%, and preferably between 93% and 98%. Absorbing solutions prepared from sulfuric acid of lower concentrations fail to remove final traces of organic fluorides from the hydrocarbons present, and with sulfuric acid of higher concentrations, i. e., oleum, there is a tendency toward formation of resinous matter in the system similar to that formed in the present process in the absence of the rare earth salt or oxide.

By "siliceous material," as used herein, is meant a compound containing silica, $SiO_2$, such as silica gel, diatomaceous earth, Attapulgus clay, other clays, and the like. It is preferred to employ silica gel in the present process because of its large surface area, ready availability, and the excellent results achieved therewith in accordance with the process of the present invention. It is preferred to employ from about 0.5 to 10 parts by weight of silica gel per 100 parts by weight of the absorbing solution.

Various organic fluorine compounds may be removed from hydrocarbons in accordance with the process of the present invention, the following being illustrative: alkyl fluorides such as ethyl, propyl, isopropyl, butyl, isobutyl, tertiary butyl, the amyl, hexyl, heptyl and octyl fluorides, and the like; cycloaliphatic fluorides such as cyclopentyl and cyclohexyl fluorides and the like. Unsaturated fluorides such as 1-fluorobutene-2 may also be removed by the present process, but in the case of unsaturated organic fluorides, it is preferred that the fluorine atom be attached to a saturated carbon atom in order to achieve rapid removal of such fluoride from the hydrocarbon admixed therewith. Mixtures of the above fluorides may also be removed. By the term, "organic fluoride," as used herein, is meant the monofluorohydrocarbons such as aliphatic, cycloaliphatic, and aromatic hydrocarbons wherein a fluorine atom has replaced a hydrogen atom. Small amounts of aromatic and olefinic hydrocarbons, say below about 1%, may be present in the hydrocarbon charge without deleterious effects, though such hydrocarbons may consume a portion of the sulfuric acid, and hence it is preferred that the charge be substantially free of aromatics and olefins.

The concentration of fluorides in the hydrocarbon charge may be widely varied, and good results obtained in their removal in accordance with the process of the present invention. Thus, good results are obtained with a fluoride concentration of 1% or more, but generally in petroleum refining operations the concentration will range from about 40 to about 500 p. p. m.

A wide range of temperature and pressure may be employed in the present process. The temperature is maintained between about 15° C. and 200° C., and preferably between 50° C. and 150° C. The pressure employed is not critical, but is maintained preferably from atmospheric to about 7,000, or even 10,000 p. s. i. Subatmospheric pressures may be employed where desired. As hereinbefore described, the operating variables will depend somewhat on the hydrocarbon charge being treated and whether it is desired to operate in the gaseous or liquid phase. It has been found that an optimum temperature exists for a given system. For example, in removing fluorides from propane in liquid phase operation, the optimum temperature is from about 80° C. to about 95° C., the pressure being substantially immaterial except that it should be sufficient to maintain the components in the liquid phase. Where it is not desired to remove substantially all of the fluorides from the charge, a lower temperature may advantageously be employed, say from 50° C. to 80° C.

In carrying out the present process wherein the hydrocarbon which contains a relatively large amount of alkyl fluoride, say above 50 p. p. m. the present absorbing material converts the organic fluoride at least in part to hydrogen fluoride. The so-formed hydrogen fluoride forms a component of the effluent gas and may easily be separated from the hydrocarbons by distillation, absorption, or other means known to the art. In the preferred embodiment wherein a siliceous material is added to the absorbing system, it is believed that at least a portion of the so-formed hydrogen fluoride reacts with the siliceous material to form silicon tetrafluoride, whereby the hydrogen fluoride is destroyed. Any silicon tetrafluoride in the effluent hydrocarbons may be removed in the same manner as hydrogen fluoride e. g., by distillation, absorption, or by other means known to the art. When the concentration of the organic fluoride is low, say below about 50 p. p. m., a large proportion of the fluoride is retained in the absorbing solution and the resulting hydrocarbons are substantially completely free of all fluorides.

As hereinbefore described, the contacting of the organic fluoride containing hydrocarbon, whether the mixture be gaseous or liquid, may be in accordance with methods known to the art. If the charge is gaseous, it may be bubbled through the absorbing solution, or it may be passed in countercurrent relation to the absorbing solution in an absorbing tower. If the charge is liquid, it may be mechanically mixed with the absorbing solution, and the phases thereafter separated. A normally gaseous hydrocarbon may be liquefied by cooling or compressing, or both, and the present process carried out therewith by liquid phase operation. Contacting should be for a time sufficient to remove the desired quantity of fluorides, and may be readily determined for a given system, as hereinafter more fully described. Consumption of the siliceous material in the preferred embodiment of present process is small because of the small concentrations of fluorides in the hydrocarbons usually treated.

In carrying out the process of the present invention, a white, finely divided precipitate of unknown composition is formed. This precipitate does not interfere with the operation of the present process. However, it is advantageous to remove this precipitate, either continuously or intermittently, and to regenerate an oxide or salt of the rare earth metal therefrom, and to dissolve the so-regenerated oxide or salt in sulfuric acid for further use in the process. In general, regeneration may be accomplished by separation of the precipitate, e. g., by filtration or centrifuging, and heating the precipitate to form the oxide of the rare earth metal, which may then be dissolved and suspended in sulfuric acid for further use in the process. In the preferred embodiment, regeneration may be accomplished by separation of the precipitate, e. g., by filtration or centrifuging, together with the silica gel, and heating the mixture thereof to form the oxide of the rare earth metal. The regenerated oxide and silica gel are then dissolved and suspended in sulfuric acid for further use in the process. Another method of regeneration which may advantageously be employed is to dissolve the separated precipitate in water, whereby if present the insoluble silica gel is removed. Aqueous sodium hydroxide is then added to the solution to form a precipitate. Air, preferably warmed to about 50° C., is then bubbled through the system for about 24 hours. The precipitate is then filtered, dried, and added to concentrated sulfuric acid, preferably in the presence of platinum, to form the absorbing solution of the present invention. Chlorine may be substituted for air, in which case the regeneration may be accomplished at a lower temperature and shorter time. On prolonged operation without regeneration of the absorbing solution, the solution may assume a dark color. No resinous material is formed, however, and the dark color does not interfere with the operation of the present invention. On regeneration of the solution, the dark color disappears.

The following examples illustrate preferred embodiments of the present invention, which is not to be considered as limited thereby:

Example 1

In order to demonstrate the efficacy of the present absorbing solution toward organic fluorides, substantially pure ethyl fluoride was prepared by liquid phase reaction between ethylene and anhydrous hydrogen fluoride at 100° C. The ethyl fluoride was then purified by washing and fractionation.

95% sulfuric acid saturated with and having an excess of ceric bisulfate was contacted with ethyl fluoride at 100° C. It was found that at atmospheric pressure, one part of the absorbing solution absorbed 155 parts of ethyl fluoride. At the end of the absorption the solution had a blackish tinge, but no resinous material formed.

The above experiment was repeated using 95% sulfuric acid without ceric bisulfate. It was found that a substantial amount of ethyl fluoride was absorbed, but the acid began to turn black at the start of the absorption and soon formed a black resinous gummy mass.

Example 2

In order to demonstrate the effect of temperature on the present process, that portion of Example 1 using sulfuric acid having an excess of ceric bisulfate was repeated under identical conditions except that the temperatures of two separate experiments were 24° C. and 100° C., respectively. At 100° C. substantially 9 times more ethyl fluoride was absorbed than at 24° C.

Example 3

A refinery stream consisting principally of propane, and having a fluoride content of 40 p. p. m. (a mixture of ethyl and isopropyl fluorides), was bubbled through an absorbing solution consisting of about 24 parts by weight of sulfuric acid and about 3 parts by weight of ceric bisulfate, this quantity of bisulfate being sufficient so that an excess thereof was suspended in the acid, which excess continued throughout the run. The volume of propane/volume of acid/hour, measured at 100° C. and 760 mm. was maintained at 52.4 throughout the run. Hydrogen fluoride was removed from the effluent gas by means of a sodium carbonate scrubber, and the concentration of organic fluorides in the resulting gas measured. It was found that the concentration of fluoride had been reduced from 40 p. p. m. to 3.2 p. p. m.

After 52.5 hours of continuous operation, during which time 528 liters of gas, measured at 760 mm. at 25 C., were processed, a finely divided white precipitate had formed, and the acid had assumed a blackish tinge. The precipitate was removed from the system, and the acid regenerated by the addition of fresh ceric bisulfate. The black coloration of the acid disappeared and the reddish color of the original absorbing solution returned. The process using the regenerated absorbing solution was continued for an additional 41 hours, substantially identical results being obtained therewith.

Example 4

Various quantities of ethyl fluoride were admixed with propane. The resulting admixtures were bubbled, under 1 atmosphere pressure, into a stirred absorbing solution consisting of 97% sulfuric acid saturated with ceric bisulfate and containing an additional quantity thereof in suspension. The temperature of each run was 100° C. The effluent gas was passed through an aqueous solution of sodium carbonate, and then analyzed. The following results were obtained:

| Ethyl fluoride concentration, p. p. m. | Weight of charge, grams | Time of contacting, minutes | Ethyl fluoride in treated gas, p. p. m. |
|---|---|---|---|
| 52 | 6.55 | 30 | [1] 0 |
| 11 | 15.02 | 105 | 0 |
| 11 | 15.58 | 120 | 0 |
| [2] 11 | 13.50 | 60 | 3 |

[1] The analytical procedure employed could not distinguish between 0 and 1 p. p. m., but could easily differentiate between 1 and 3 p. p. m.
[2] No ceric bisulfate employed; a black resinous mass rapidly formed in and fouled the absorbing solution.

Example 5

Propane from a refinery stream containing 40 p. p. m. of organic fluoride (a mixture of ethyl and isopropyl fluorides) was bubbled into an absorbing solution consisting of about 24 parts of 95% sulfuric acid and about 3 parts of ceric bisulfate, this quantity of bisulfate being sufficient to maintain an excess thereof suspended in the acid throughout the run. The temperature of the absorbing solution was maintained at 100° C. and the absorption was performed at a pressure of 1 atmosphere. Hydrogen fluoride was removed from the effluent gas by scrubbing with an aqueous solution of sodium carbonate, and the scrubbed gas analyzed for fluorides. After 304.5 hours a total of 2,340 liters of gas (25° C. and 760 mm.) had been processed. On continued operation, a finely dispersed crystalline precipitate was formed and the solution assumed a blackish tint; no tarry or resinous material was observed. The effluent gas stream contained an average of about 4 p. p. m organic fluoride.

After 304.5 hours of operation, the adduct was separated from the system and heated to 800° C. in the presence of air. About 1 part of the so-formed ceric oxide was dissolved and suspended in about 36 parts of 95% sulfuric acid, and the above described procedure continued with substantially identical results.

Example 6

The procedure described in Example 3 was repeated using in place of ceric bisulfate the following salts and oxides: Sodium sulfate, ferric sulfate, chromic sulfate, titanium sulfate, cupric sulfate, mercuric oxide, sodium dichromate, zirconium sulfate, and ferric chloride.

It was found that none of the above salts and oxides gave results comparable to those of the rare earth metals, as above described, i. e., all were inoperative in that black resinous material rapidly formed in and fouled the absorbing system.

Example 7

In order to illustrate the efficacy of the process of the present invention for the removal of organic fluorides from a normally gaseous hydrocarbon by liquid phase operation, including optimum conditions of operation, the following series of experiments were performed.

Various quantities of a refinery propane stream having a fluoride concentration of 68 p. p. m. were contacted with 50 cc. of 95% sulfuric acid containing dissolved and suspended therein a total of 7 grams of ceric bisulfate. The propane had been a component of a hydrogen fluoride catalyzed alkylation reaction, and the fluorides resulting therefrom consisted of a mixture of ethyl and isopropyl fluorides. Time and pressure were varied, and two temperatures employed. The propane was maintained in the liquid phase throughout the experiment. The following results were obtained:

| Propane Charged | | Propane Recovered | | Time of Contact, Hours | Pressure (p. s. i. g.) | v./v./hour [1] | Final Fluoride Concentration (p. p. m.) |
|---|---|---|---|---|---|---|---|
| Weight (grams) | Vol. at Reaction Temp. (cc.) | Weight (grams) | Percent | | | | |
| [T=50°C.] | | | | | | | |
| 60 | 126 | 60 | 100 | .5 | 210 | 5.04 | 23.1 |
| 56 | 117 | 52 | 93 | .5 | 250 | 4.68 | 21.9 |
| 46 | 96 | 46 | 100 | .75 | 255 | 2.56 | 14.5 |
| 17 | 35.6 | 17 | 100 | .5 | 255 | 0.71 | 4.3 |
| [T=80°C.] | | | | | | | |
| 53 | 12.0 | 52 | 98 | .5 | 525 | 4.80 | 7.1 |
| 33 | 74.6 | 33 | 100 | .5 | 542 | 3.00 | 4.2 |
| 33 | 74.7 | 30 | 91 | 1.0 | 500 | 1.49 | 2.2 |

[1] Volume of propane per volume of acid contacted per hour.
Acid recovery in each case was 100%.

From the foregoing data, it is apparent that an increase of temperature increases the efficiency of operation. Thus, at 50° C. and a v./v./hour of 0.5–1, the efficiency of fluoride removal is about the same as at 80° C. with a v./v./hour of about 3. Efficiency of operation is not dependent upon pressure.

Example 8

The following example demonstrates the efficacy of the present process using rare earth salts other than those of cerium.

An absorbing solution was prepared by adding 1 gram of lanthanum sulfate to 100 cc. of 95% sulfuric acid, this quantity of salt being sufficient to maintain a portion thereof suspended in the acid throughout the run. Propane containing 40 p. p. m. fluoride (a mixture of ethyl and isopropyl fluorides) in the gas phase was bubbled under atmospheric pressure, into the absorbing solution during mechanical agitation thereof. The rate of propane introduction was 4.27 liters per hour for a total of 257 hours. The absorbing solution was held at 100° C. throughout the run. Total propane charged, measured at 1 atmosphere pressure and 25° C. was 1.099 liters (1,680 grams).

The fluoride concentrations in the propane effluent after the indicated number of hours were as follows:

| Time (total hours) | Fluoride Concentration (p. p. m.) |
|---|---|
| 6 | 3.3 |
| 17.5 | 3.8 |
| 89 | 3.7 |
| 123 | 4.2 |
| 199 | 3.9 |

The absorbing solution assumed a black tinge soon after operation was commenced, but no resinous or gummy fouling material formed throughout the run. It should be noted that no decrease in efficiency was observed throughout the run. Of course, the fluoride concentration could be further decreased by changing operating conditions, such as by decreasing the rate of flow of the fluoride contaminated propane through the absorbing solution.

Example 9

The process described in Example 7 was repeated, except that 4 grams of silica gel were added to the absorbing solution. The following table describes the conditions employed and results obtained:

Propane charged:
    Weight (grams) _____ 40
    Volume at reaction temperature (cc.) __ 83.6
Propane recovered:
    Weight (grams) _____ 40
    Percent _____ 100
Time of contact (hours) _____ 0.5
Temperature _____°C__ 50
Pressure (p. s. i. g.) _____ 285
V./v./hour[1] _____ 3.34
Final fluoride concentration (p. p. m.) _____ 8

[1] Volume of propane per volume of acid contacted per hour.

Comparing the foregoing data with the data of Example 7, it is immediately apparent that under comparable conditions the addition of silica gel to the absorbing solution reduced the final fluoride content of the product to 50% of the value obtained without the silica gel present.

The addition of siliceous material, preferably silica gel, to the other systems hereinbefore described gives substantially identical results, i. e., the final fluoride concentration in the treated hydrocarbon is reduced to about ½ the value observed in the absence of such siliceous material.

The invention claimed is:

1. Process for removing organic fluorides from hydrocarbons which comprises contacting a mixture of hydrocarbons and organic fluorides with sulfuric acid having a compound selected from the group consisting of a salt of a rare earth metal and an oxide of a rare earth metal incorporated therein.

2. Process according to claim 1 wherein the concentration of sulfuric acid is from 90 to 100%.

3. Process according to claim 2 wherein the quantity of the compound selected from the group consisting of a salt of a rare earth metal and an oxide of a rare earth metal is in excess of its solubility in the sulfuric acid.

4. Process for removing alkyl fluorides from hydrocarbons which comprises contacting a mixture of hydrocarbons and alkyl fluorides with sulfuric acid of a concentration of from 90 to 100% having a salt of a rare earth metal incorporated therein.

5. Process according to claim 4 wherein the quantity of salt employed is in excess of its solubility in the sulfuric acid.

6. Process according to claim 5 wherein the salt is a ceric salt.

7. Process according to claim 6 wherein the salt is ceric bisulfate.

8. Process for removing alkyl fluoride from propane which comprises contacting a mixture of alkyl fluoride and propane with concentrated sulfuric acid containing ceric bisulfate incorporated therein.

9. Process according to claim 8 wherein the mixture of alkyl fluoride and propane is maintained in the gaseous phase.

10. Process according to claim 8 wherein the mixture of alkyl fluoride and propane is maintained in the liquid phase.

11. Process for removing alkyl fluorides from hydrocarbons which comprises contacting a mixture of hydrocarbons and alkyl fluorides with sulfuric acid of a concentration of from 90 to 100% having an oxide of a rare earth metal incorporated therein.

12. Process according to claim 11 wherein the quantity of oxide employed is in excess of its solubility in the sulfuric acid.

13. Process according to claim 12 wherein the oxide is ceric oxide.

14. Process for removing alkyl fluoride from propane which comprises contacting a mixture of alkyl fluoride and propane with concentrated sulfuric acid containing ceric oxide incorporated therein.

15. Process according to claim 14 wherein the mixture of alkyl fluoride and propane is maintained in the gaseous phase.

16. Process according to claim 14 wherein the mixture of alkyl fluoride and propane is maintained in the liquid phase.

17. Process for removing alkyl fluorides from hydrocarbons which comprises contacting a mixture of hydrocarbons and alkyl fluorides with sulfuric acid of a concentration of from 90 to 100% having lanthanum sulfate incorporated therein.

18. Process according to claim 17 wherein the quantity of lanthanum sulfate employed is in excess of its solubility in the sulfuric acid.

19. Process for removing organic fluorides from hydrocarbons which comprises contacting a mixture of hydrocarbons and organic fluorides with a mixture of sulfuric acid, a compound selected from the group consisting of a salt of a rare earth metal and an oxide of a rare earth metal, and a siliceous material.

20. Process according to claim 19 wherein the siliceous material is silica gel.

21. Process according to claim 19 wherein the concentration of sulfuric acid is from 90 to 100%.

22. Process according to claim 21 wherein the concentration of the compound selected from the group consisting of a salt of a rare earth metal and an oxide of a rare earth metal is in excess of its solubility in the sulfuric acid.

23. Process for removing alkyl fluorides from hydrocarbons which comprises contacting a mixture of hydrocarbons and alkyl fluorides with a mixture of sulfuric acid of a concentration of from 90 to 100%, a salt of a rare earth metal, and silica gel.

24. Process according to claim 23 wherein the salt is a ceric salt and wherein said salt is employed in excess of its solubility in the sulfuric acid.

25. Process for removing alkyl fluoride from propane which comprises contacting a mixture of alkyl fluoride and propane with a mixture of concentrated sulfuric acid, ceric bisulfate and silica gel.

26. Process for removing alkyl fluorides from hydrocarbons which comprises contacting a mixture of hydrocarbons and alkyl fluorides with a mixture of sulfuric acid of a concentration of from 90 to 100%, an oxide of a rare earth metal, and silica gel.

27. Process according to claim 26 wherein the oxide is ceric oxide and wherein said oxide is employed in excess of its solubility in the sulfuric acid.

28. Process for removing alkyl fluorides from hydrocarbons which comprises contacting a mixture of hydrocarbons and alkyl fluorides with a mixture of sulfuric acid of a concentration of from 90 to 100%, lanthanum sulfate and silica gel.

29. Process according to claim 28 wherein the quantity of lanthanum sulfate employed is in excess of its solubility in the sulfuric acid, and the quantity of silica gel is from 0.5 to 10 parts by weight per 100 parts by weight of the absorbing solution.

EDWARD J. JANOSKI.

REFERENCES CITED

The following references are of record in the file of this patent:

UNITED STATES PATENTS

| Number | Name | Date |
|---|---|---|
| 1,988,740 | Kingman | Jan. 22, 1935 |
| 2,434,409 | Ipatieff et al. | Jan. 13, 1948 |
| 2,463,930 | Wildman | Mar. 8, 1949 |